3,280,063
ESTERS OF A MONOHYDRIC ALIPHATIC ALCOHOL HAVING 10-20 CARBON ATOMS WITH A MONONUCLEAR AROMATIC ACID HAVING 3-6 CARBOXY GROUPS AS FLOW PROMOTERS FOR SOUND RECORD COMPOSITIONS
Thomas Zawadzki, Templeton, and Richard M. Lee and Algirdas A. Reventas, Leominster, Mass., assignors to The Borden Company, New York, N.Y., a corporation of New Jersey
No Drawing. Filed Mar. 29, 1961, Ser. No. 99,071
9 Claims. (Cl. 260—28.5)

This invention relates to a thermoplastic composition containing a flow promoter of dependable properties for the purpose.

In making disk shaped phonograph records, for which the composition is particularly suited, it is customary to include a promoter of flow of the composition during pressing in hot condition to the thickness and shape desired.

The material commonly used for the flow promotion is carnauba wax. This wax is a natural commodity. Its properties vary with its history, even with the age of the leaves of the carnauba palm from which the wax is gathered. The wax gives results in flow promotion, therefore, that are not consistent or dependable from lot to lot and are sometimes higher than expected or necessary and sometimes lower. Yet there has been heretofore no satisfactory replacement for carnauba wax.

The present invention provides such replacement in the form of a flow promoter that is reproducible in constant quality and dependable in its effect on flow promotion in the record composition.

Briefly stated the invention comprises a composition suitable for use in making phonograph records, the composition containing a vinyl or other thermoplastic resin and, as flow promoter, a higher alcohol ester of a mononuclear aromatic acid having 3–6 carboxy groups to the molecule. In the preferred embodiment, the flow promoter is a tetraalkyl ester of pyromellitic acid, the alkyl groups having on the average at least 10 carbon atoms.

As to materials, the composition is any one that is conventional for a phonograph record except that the promoter of flow of the resin therein is the said ester. Ordinarily the basic material, i.e., the component of highest proportion such as half or more of the total is any thermoplastic polymeric material that is conventionally used as the base for sound records, as for example a polyvinyl ester in which vinyl chloride is the monomer represented in largest proportion in the resin. Examples of resins that meet the requirements and may be used are polyvinyl chloride and copolymers or interpolymers of vinyl chloride with one or more of the following ethenoid monomers: vinyl acetate as in the proportion of about 2%–20% of the total weight of the copolymer, vinylidene chloride, and vinyl esters of monobasic acids having 2–20 carbon atoms to the molecule. Other resins that may be used are alkyl esters of acrylic and methacrylic acids and polystyrenes.

More specific examples that illustrate the resins to be used in the record compositions are polyvinyl compounds, e.g., (1) vinyl chloride homopolymer having a specific viscosity of 0.4–2, as determined by the equation Specific viscosity=

$$\frac{\text{Solution viscosity} - \text{solvent viscosity}}{\text{Solvent viscosity}}$$

wherein the solution viscosity refers to the viscosity of a 1% (by weight) solution of the resin in cyclohexanone at 25° C. and the solvent viscosity refers to the viscosity of cyclohexanone at 25° C.; (2) a copolymer of vinyl chloride with vinyl acetate having a specific viscosity by the same test of 0.4–1.5 and having therein 2 to 20 parts of vinyl acetate and suitably 8–16 parts for 100 parts total weight of said copolymer; and (3) polystyrene having a number average molecular weight of 50,000–250,000.

It is customary to use an organic extender in the record composition. The extender selected here is any that is in commercial use for this purpose in record manufacture. It must be a solid at room temperature such as 70° F. but fusible at compounding temperatures as low as 250° F. and compatible with the selected resin or resin mixture at all temperatures between the lowest winter temperature at which the record may be stored up to the maximum temperature for compounding as, for instance, within the range −40°–400° F. Examples of such extenders that we can use are paraffin wax chlorinated to the extent of making it compatible as stated and substantially non-volatile at temperatures up to and including 300° F., e.g., Chlorowax 70, a chlorinated paraffin wax of chlorine content approximately 70% and melting point about 195°–212° F. It is insoluble in water but soluble in hydrocarbon liquids and in thermoplastic resins of the class illustrated above. Other extenders that we can use are solid coal tar and petroleum hydrocarbons, various thermoplastic condensation resins of formaldehyde with by-products containing phenolic groups from sugar and paper industry, cumarone indene resins, and the like.

Other conventional materials may be used for their usual effects. Among these are the stabilizers for the vinyl esters in the composition as, for example, the metal salts such as barium, cadmium and zinc salts of any $C_{12}$–$C_{18}$ monocarboxylic aliphatic acid such as lauric or stearic, alkyl phenols such as nonyl phenols, mixtures of triphenyl phosphite with the metal salts of kind described, and the like. Specific stabilizers that we use, either alone or mixed with each other, are barium or cadmium laurate, dibasic lead stearate, and tribasic lead fumarate for the vinyl esters. Stabilizers are ordinarily not used with the polyvinyl benzene (polystyrene), although they may present, e.g., di-tert. butyl catechol or 2,6-di-tert. butyl-p-cresol.

The flow promoter is a $C_{10}$–$C_{20}$ alkyl ester of a mononuclear aromatic acid having 3–6 carboxylic groups. Examples of the acids that illustrate the class to be used are hemimellitic, trimellitic, trimesic, prehnitic, mellophanic, pyromellitic, benzenepentacarboxylic and mellitic. Examples of the alkyl groups that are recommended in such esters are decyl, dodecyl, hexadecyl and stearyl. The ester is complete, each of the carboxylic groups being esterified with the acid of kind described. There may be used a certain proportion of a lower alkyl groups in the esters, however, provided the average number of carbon atoms in all of the alkyl groups is not less than 10. Examples of the mixed esters are those of the said acids with isobutyl, n-butyl, n-hexyl, n-octyl and like $C_4$–$C_8$ alcohols with $C_{10}$–$C_{20}$ alcohols, in which the average number of carbon atoms per alkyl groups represented in the ester is 10–20. When the lower alcohol is esterified alone, as in the ester tetraisobutyl pyromellitate, there is excessive softening of the record composition which introduces complications in the manufacture, such as adhering of the hot stock to the processing equipment or objectionable softness of the finished product. The tetra higher alcohol esters of pyromellitic acid, although compatible at all temperatures with the record composition, are not so active as softening or plasticizing agents as to introduce these difficulties.

The ester selected as the flow promoter, is not available commercially, is prepared either by a method described in the literature for compounds of the class to be made or as follows:

There is first made the methyl ester of the selected acid. The methyl ester is then converted, by ester interchange, to the corresponding ester of the higher alcohol which is desired for use as the actual flow promoter, all by usual technique. Thus there are mixed the pyromellitic or other member of the class of acids listed herein with at least an equivalent proportion of methanol and in any event with sufficient methanol to dissolve all of the selected acid. Into the resulting solution there is then introduced toluene sulfonic acid or sulfuric acid in the amount of approximately 1% of the combined weight of the methanol and the pyromellitic or like acid. There is next introduced benzene in amount approximately half that of the methanol. The whole is then warmed to refluxing under a good fractionating column. The fractioned vapors are condensed in a down condenser which delivers the resulting condensate to a water separator of conventional type. The water formed in the esterification collects in the bottom of the separator and can be drawn off. The upper layer, high in benzene content, is returned to the reaction mass. When no further water comes over or when test of the reacting mass shows the acidity to have fallen to a low level and to remain substantially constant, then the fractionation is discontinued. The whole is then distilled, i.e., at atmospheric pressure to expel the benzol and any excess of methanol that remains. The higher alcohol whose ester is sought as, for instance, any of the $C_{10}$–$C_{20}$ alcohols shown herein is then introduced in amount equivalent to the pyromellitic acid used. The heating is then resumed with fractionation. If the hot mixture is not fluid, there may be introduced additional methanol or other lower alcohols such as ethanol in amount to liquify the charge. The heating and fractionation are continued until the lower alcohol is substantially replaced in the ester by the higher alcohol and the replaced methanol is distilled from the system.

The resulting ester of the $C_{10}$–$C_{20}$ alcohol is suitably subjected to vacuum distillation to remove first a foreshot of any remaining lower alcohol or benzene and then any of the higher $C_{10}$–$C_{20}$ alcohols that have not been esterified. If a substantially neutral ester is required in the record composition, there may be introduced during this distillation a small amount of soda ash such as an amount equivalent to the total acidity of the mixture as determined by titration. Finally the ester of the higher alcohol with the pyromellitic or like acid is filtered hot to remove any insoluble material present. The resulting ester is then ready for use as flow promoter.

In the record composition, the proportion of the components of the several classes as well as their kind are conventional, with the exception of the kind and amount of flow promoter. Suitable proportions, however, are illustrated in the following table.

| Component Used | Parts for 100 Parts Total | |
| --- | --- | --- |
| | Permissible | Recommended |
| Thermoplastic resin | 50–99 | 70–98 |
| Extender | 0–48 | 0–28 |
| Flow promoter (our ester) | 0.05–10 | 0.1–2 |
| Stabilizers | Variable, as desired. | |
| Pigments | | |

The proportion of the flow promoter is ordinarily about 0.5–1.5 parts for 100 parts total of the composition. With the amounts of 2 parts or higher, however, we find that the composition is either lubricated to an unnecessary extent or over-lubricated as shown by the softness or stickiness on the mixing rolls or by the tests for penetrability or flexibility of the finished record. In any case, the amount of the ester to be incorporated as flow promoter is not in excess of the amount that can be compounded with the rest of the record composition, particularly with the polyvinyl esters therein, and remain compatible at temperatures as low as −40° F. The lower the number of carbon atoms in the alkyl moiety of the ester used, the larger the proportion of material that is compatible.

In the examples that follow and elsewhere herein, proportions are expressed as parts by weight unless specifically stated to the contrary.

*Examples 1 and 2*

The table shows suitable proportions of the various materials and compares results of our invention in columns headed 1 and 2 with compositions that use either carnauba wax or no flow promoter and are not examples of our invention.

The components of kind and in amount shown were mixed on a laboratory two-roll mill, of roller sizes 6 inches diameter and 12 inches long for 5 minutes at 265° F. To determine the flow characteristics, 1.6 gram samples of the different compositions were pressed between rigid plates for 15 seconds at 1,250 p.s.i. and at 250° F. for the first test reported and at 300° F. for the later one. The diameter of the pressed disks in cm. is reported herein as the "flow" of the record composition.

| Component | Examples | | Comparative Compositions | |
| --- | --- | --- | --- | --- |
| | 1 | 2 | (a) | (b) |
| Copolymer of vinyl chloride (85%) and vinyl acetate (15%) | 47 | 47 | 48 | 47 |
| Polyvinyl chloride | 30 | 30 | 30 | 30 |
| Chlorowax 70 | 20 | 20 | 20 | 20 |
| Ba-Cd laurate | 1.5 | 1.5 | 1.5 | 1.5 |
| Dibasic lead stearate | 0.5 | 0.5 | 0.5 | 0.5 |
| Flow promoter: | | | | |
|   Tetrastearyl pyromellitate | 1 | | | |
|   Tetraisobutyl pyromellitate | | 1 | | |
|   Carnauba wax | | | | 1 |
| Total weight | 100 | 100 | 100 | 100 |
| Mill characteristics | Good | Good | Sticky | Good |
| Flow, cm., at— | | | | |
|   250° F | 6.30 | 5.30 | 5.20 | 6.77 |
|   300° F | 7.90 | 6.50 | 6.43 | 7.70 |

The results with all of the compositions tested is to be regarded as satisfactory, with the exception of that of column (a) which has no flow promoter. With our pyromellitate esters, however, the results, unlike those for compositions using carnauba wax, are reproducible, from lot to lot, without concern as to the variations in quality of the ester, a chemical compound.

When the ester tetrastearyl pyromellitate was used in proportion of 2 parts for 100 parts of the whole composition, there was over-lubrication on the mixing rolls. The finished product, however, was very good in flow rate being in fact, 7.17 and 8.80 at the two temperatures respectively. Likewise when the tetraisobutyl pyromellitate was used in the proportion of 5 parts for 100 parts total of the composition, the resin was over-plasticized and the whole composition was too soft without, however, a correspondingly high flow, the flow being 5.80 and 7.10 at the two temperatures.

*Example 3*

The compounding procedure used in Examples 1 and 2 were used except that the composition was as follows.

| Component: | Parts by weight |
|---|---|
| Vinyl chloride and vinyl acetate copolymer (91:9) of specific viscosity 0.62 | 55.5 |
| Vinyl chloride homopolymer, sp. visc. 0.75 | 22 |
| Chlorowax 70 | 20 |
| Tetrabasic lead fumarate | 1 |
| Dibasic lead stearate | 0.5 |
| Tetrastearyl pyromellitate, M.P. 64° C. | 1 |
| Total | 100 |
| Flow, cm. at: | |
| 250° F. | 5.9 |
| 300° F. | 7.7 |

For comparison, there were made tests using 1% carnauba wax of melting point 85° C. as the flow promoter. The flow of the compounded mixture in centimeters was 5.8 and 7.2 at the two temperatures shown in the table.

*Examples 4–8*

The procedure and composition tabulated in Example 3 were used except that the following materials of the melting points shown were substituted as flow promoters, in turn and in equal proportion by weight, for the tetrastearyl pyromellitate, and the mixing time on the rolls was 5 minutes at 250° F.

The finished compounded compositions had the flow shown in centimeters in the following table.

| Ex. No. | Flow Promoter | M.P., °C. | Flow, cm., at— | |
|---|---|---|---|---|
| | | | 250° F. | 300° F. |
| 4 | Tetrahexadecyl pyromellitate | 63 | 5.7 | 6.9 |
| 5 | Tetratetradecyl pyromellitate | 63 | 5.3 | 6.5 |
| 6 | Tetradodecyl pyromellitate | 45 | 5.1 | 6.3 |
| 7 | Tetradecyl pyromellitate | 36 | 5.0 | 6.3 |
| 8 | Tetraisobutyl pyromellitate | | 4.9 | 6.5 |

*Example 9*

The procedure of Example 3 was followed except the mixing time in the laboratory two-roll mill was 5 minutes at a temperature of 350° F. A comparison was made here of compositions using as the thermoplastic resin a general purpose polystyrene and the same compounded with flow promoters to improve processability.

| Component | Parts by Weight | | | |
|---|---|---|---|---|
| | a | b | c | d |
| Polystyrene | 100 | 97 | 97 | 93 |
| Tetrastearyl pyromellitate | | 2 | | 3 |
| Carnauba wax | | | 2 | |
| Methyl styrene trimer | | | | 3 |
| Excelsior carbon black | | 1 | 1 | 1 |
| Milling characteristics at 350° F | Sticky | Good | Good | Good |
| Flow, cm., at— | | | | |
| 300° F | 6.10 | 6.17 | 6.17 | 6.50 |
| 350° F | 6.90 | 7.23 | 7.23 | 7.67 |
| 400° F | 8.00 | 8.20 | 7.97 | 8.60 |

The formula "b" only is an example of the instant invention.

The use of tetrastearyl pyromellitate improves the flow characteristics of composites containing general purpose polystyrene making such composition satisfactory. The use of carnauba wax does not improve the flow characteristics of the polystyrene as much as does the tetrastearyl pyromellitate, particularly at 400° F.

*Example 10*

The procedure and composition of Example 1 are used except that the 77 parts of vinyl resins are replaced by 77 parts of polymethyl methacrylate. When the final compounded mix is heated to the softening point of the methacrylate and then pressed into a disk, the flow properties are satisfactory.

In variations of this example, the polymethyl methacrylate is replaced, in turn, by equal weights of the following in polymeric form: ethyl and propyl methacrylate and methyl, ethyl and propyl acrylate.

It will be understood that it is intended to cover all changes and modifications of the examples of the invention herein chosen for the purpose of illustration which do not constitute departures from the spirit and scope of the invention.

We claim:

1. A plastic composition for use in a sound record comprising:
   (1) A polymeric thermoplastic resin, the proportion of said resin being within the range 50–99 parts by weight for 100 parts of said composition, said resin being selected from the group consisting of polyvinyl chloride, polymethyl acrylate, polyethyl acrylate, polypropyl acrylate, polymethyl methacrylate, polyethyl methacrylate, polypropyl methacrylate, polystyrene, and copolymers of vinyl chloride with about 2–20% of its weight of a monomer selected from the group consisting of vinylidene chloride and vinyl esters of monobasic aliphatic acids having 2–20 carbon atoms to the molecule, and
   (2) an admixed flow promoter that is compatible with said resin at all temperatures between minus 40° and 400° F. and that is an ester of a monohydric aliphatic alcohol having 10–20 carbon atoms to the molecule with a mononuclear aromatic acid having 3–6 carboxy groups to the molecule, the proportion of the ester being within the range about 0.05–1.5 parts by weight for 100 parts of said composition.

2. The composition of claim 1, the said resin being a mixture of polyvinyl chloride with a thermoplastic copolymer of vinyl chloride with an ethenoid monomer selected from the group consisting of vinylidene chloride, and vinyl esters of monobasic acids having 2–20 carbon atoms to the molecule.

3. The composition of claim 1, said resin being a copolymer of vinyl chloride and vinyl acetate, the vinyl chloride being present in said copolymer to the extent of at least 50% by weight of said copolymer.

4. A composition for phonograph records comprising approximately 22 parts by weight of polyvinyl chloride, 55.5 parts of a copolymer of vinyl chloride with vinyl acetate in the proportions of about 2%–20% of the acetate on the weight of the copolymer, 20 parts of chlorinated paraffin wax of 70% chlorine content as an extender, a stabilizer for the polyvinyl chloride and the said copolymer, and about 0.05–1.5 parts of tetrastearyl pyromellitate, said proportions being based upon 100 parts by weight of said composition.

5. A composition for phonograph records comprising approximately 97 parts by weight of polystyrene, a maximum of about 2 parts by weight of a flow promoter that is an ester of a monohydric aliphatic alcohol having at least 10 carbon atoms to the molecule with a mononuclear aromatic acid having 3–6 carboxy groups to the molecule, said proportions being based upon 100 parts by weight of said composition.

6. A plastic composition for use in a sound record comprising:
   (1) A polymeric thermoplastic resin, the proportion of said resin being within the range 50–99 parts by weight for 100 parts of said composition, said resin being selected from the group consisting of polyvinyl chloride, polymethyl acrylate, polyethyl acrylate, polypropyl acrylate, polymethyl methacrylate, polyethyl methacrylate, polypropyl methacrylate, polystyrene, and copolymers of vinyl chloride with about 2–20% of its weight of a monomer selected from the group consisting of vinylidene chloride and vinyl esters of monobasic aliphatic acids having 2–20 carbon atoms to the molecule, and
   (2) an admixed flow promoter that is compatible with said resin at all temperatures between minus 40° and 400° F. and that is an ester of a monohydric aliphatic alcohol having 10–20 carbon atoms to the molecule with pyromellitic acid, the proportion of the ester being within the range about 0.05–1.5 parts by weight for 100 parts of said composition.

7. A plastic composition for use in a sound record comprising:
(1) A polymeric thermoplastic resin, the proportion of said resin being within the range 50–99 parts by weight for 100 parts of said composition, said resin being selected from the group consisting of polyvinyl chloride, polymethyl acrylate, polyethyl acrylate, polypropyl acrylate, polymethyl methacrylate, polyethyl methacrylate, polypropyl methacrylate, polystyrene, and copolymers of vinyl chloride with about 2–20% of its weight of a monomer selected from the group consisting of vinylidene chloride and vinyl esters of monobasic aliphatic acids having 2–20 carbon atoms to the molecule, and
(2) an admixed flow promoter that is compatible with said resin at all temperatures between minus 40° and 400° F. and that is an ester being a tetra-alkyl ester of pyromellitic acid and the number of carbon atoms per alkyl group in the ester averaging 10–20, the proportion of the ester being within the range about 0.05–1.5 parts by weight for 100 parts of said composition.

8. A plastic composition for use in a sound record comprising:
(1) A polymeric thermoplastic resin, the proportion of said resin being within the range 50–99 parts by weight for 100 parts of said composition, said resin being selected from the group consisting of polyvinyl chloride, polymethyl acrylate, polyethyl acrylate, polypropyl acrylate, polymethyl methacrylate, polyethyl methacrylate, polypropyl methacrylate, polystyrene, and copolymers of vinyl chloride with about 2–20% of its weight of a monomer selected from the group consisting of vinylidene chloride and vinyl esters of monobasic aliphatic acids having 2–20 carbon atoms to the molecule, and
(2) an admixed flow promoter that is compatible with said resin at all temperatures between minus 40° and 400° F. and that is an ester being tetrastearyl pyromellitate, the proportion of the ester being within the range about 0.05–1.5 parts by weight for 100 parts of said composition.

9. A plastic composition for use in a sound record comprising:
(1) A polymeric thermoplastic resin, the proportion of said resin being within the range 50–99 parts by weight for 100 parts of said composition, said resin being selected from the group consisting of polyvinyl chloride, polymethyl acrylate, polyethyl acrylate, polypropyl acrylate, polymethyl methacrylate, polyethyl methacrylate, polypropyl methacrylate, polystyrene, and copolymers of vinyl chloride with about 2–20% of its weight of a monomer selected from the group consisting of vinylidene chloride and vinyl esters of monobasic aliphatic acids having 2–20 carbon atoms to the molecule, and
(2) an admixed flow promoter that is compatible with said resin at all temperatures between minus 40° and 400° F. and that is an ester being a mixed ester of a $C_4$–$C_8$ alcohol and a $C_{10}$–$C_{20}$ alcohol with pyromellitic acid and the number of carbon atoms per alkyl group of the mixed ester averaging 10–20, the proportion of the ester being within the range about 0.05–1.5 parts by weight for 100 parts of said composition.

References Cited by the Examiner
UNITED STATES PATENTS

| | | |
|---|---|---|
| 1,932,889 | 10/1933 | Groff. |
| 1,993,736 | 3/1935 | Graves et al. |
| 2,269,267 | 1/1942 | Hunter. |
| 2,572,798 | 10/1951 | Ayers _____ 106—37 |
| 2,636,867 | 4/1953 | Humfeld _____ 106—37 |
| 3,043,792 | 7/1962 | Hurwitz. |

OTHER REFERENCES

Simonds et al.: Handbook of Plastics, 2nd edition, D. Van Nostrand Co., Inc., N.Y., N.Y., p. 381, 1949.

MORRIS LIEBMAN, *Primary Examiner.*

MILTON STERMAN, ALEXANDER H. BRODMERKEL, *Examiners.*

J. ZIEGLER, D. C. KOLASCH, B. A. AMERNICK,
*Assistant Examiners.*